(12) United States Patent
Nakajima

(10) Patent No.: US 11,623,479 B2
(45) Date of Patent: Apr. 11, 2023

(54) TIRE

(71) Applicant: SUMITOMO RUBBER INDUSTRIES, LTD., Hyogo (JP)

(72) Inventor: Koichi Nakajima, Kobe (JP)

(73) Assignee: SUMITOMO RUBBER INDUSTRIES, LTD., Hyogo (JP)

(*) Notice: Subject to any disclaimer, the term of this patent is extended or adjusted under 35 U.S.C. 154(b) by 147 days.

(21) Appl. No.: 17/275,228

(22) PCT Filed: Aug. 7, 2019

(86) PCT No.: PCT/JP2019/031046
§ 371 (c)(1),
(2) Date: Mar. 11, 2021

(87) PCT Pub. No.: WO2020/059345
PCT Pub. Date: Mar. 26, 2020

(65) Prior Publication Data
US 2022/0024257 A1   Jan. 27, 2022

(30) Foreign Application Priority Data

Sep. 19, 2018  (JP) .............................. JP2018-174846
May 27, 2019  (JP) .............................. JP2019-098720

(51) Int. Cl.
*B60C 11/12* (2006.01)

(52) U.S. Cl.
CPC ... *B60C 11/1218* (2013.01); *B60C 2011/1213* (2013.01); *B60C 2011/1227* (2013.01)

(58) Field of Classification Search
CPC ......... B60C 2011/1213; B60C 11/1218; B60C 11/12; B60C 2011/1227
See application file for complete search history.

(56) References Cited

U.S. PATENT DOCUMENTS

| 6,170,546 B1 | 1/2001 | Koyama et al. |
| 2004/0216826 A1 | 11/2004 | Metzger |
| 2007/0199634 A1* | 8/2007 | Sakamaki ........... B60C 11/1218 152/902 |
| 2012/0118457 A1 | 5/2012 | Matrascia et al. |

(Continued)

FOREIGN PATENT DOCUMENTS

| DE | 19543940 A | * 5/1997 | ............. B60C 11/12 |
| EP | 2 660 081 | 11/2013 | |

(Continued)

OTHER PUBLICATIONS

DE 19543940 Machine Translation; Lehman, Gabriele (Year: 1997).*

(Continued)

*Primary Examiner* — Robert C Dye
*Assistant Examiner* — Nicholas J Weiler
(74) *Attorney, Agent, or Firm* — Greenblum & Bernstein, P.L.C.

(57) ABSTRACT

A tire having a tread portion that is provided with sipes. Four sipe segments of the sipe include a first sipe segment, a second sipe segment, a third sipe segment, and a fourth sipe segment. At least one of the first sipe segment and the third sipe segment includes, in the cross section orthogonal to the length direction, an oscillated portion which extends in the tire radial direction, while oscillating in the lateral direction orthogonal to the length direction.

17 Claims, 12 Drawing Sheets

(56) References Cited

U.S. PATENT DOCUMENTS

| | | |
|---|---|---|
| 2014/0290815 A1* | 10/2014 | Tomida ............... B60C 11/1236 152/209.18 |
| 2015/0053321 A1 | 2/2015 | Goncalves Ankiewicz et al. |
| 2015/0266346 A1 | 9/2015 | Kaji et al. |
| 2016/0052346 A1 | 2/2016 | Jang et al. |
| 2017/0368883 A1 | 12/2017 | Kigami |

FOREIGN PATENT DOCUMENTS

| | | | |
|---|---|---|---|
| EP | 2660080 A1 | 11/2013 | |
| JP | H11-20412 A | 1/1999 | |
| JP | 2009-214697 A | 9/2009 | |
| JP | 2011105131 A * | 6/2011 | ......... B60C 11/1218 |
| JP | 2016-43924 A | 4/2016 | |
| JP | 2016-84082 | 5/2016 | |
| JP | 2016-88342 A | 5/2016 | |
| JP | 2016088342 A * | 5/2016 | |
| JP | 2018-1803 A | 1/2018 | |
| WO | 2009/077808 | 6/2009 | |
| WO | 2012/001488 A1 | 1/2012 | |
| WO | 2014/064936 A1 | 5/2014 | |

OTHER PUBLICATIONS

JP 2011-105131 Machine Translation; Morito, Takumi (Year: 2011).*
JP 2016-088342 Machine Translation, Ohashi, Toshiyuki (Year: 2016).*
Extended European Search Report, European Patent Office, in counterpart European Patent Application No. 19862350.6, dated May 11, 2022 (in English).
International Search Report issued in International Patent Application No. PCT/JP2019/031046, dated Oct. 29, 2019, with English translation.
International Preliminary Report on Patentability issued in International Patent Application No. PCT/JP2019/031046, dated Mar. 23, 2021, with English translation.

* cited by examiner

FIG.12
(A)
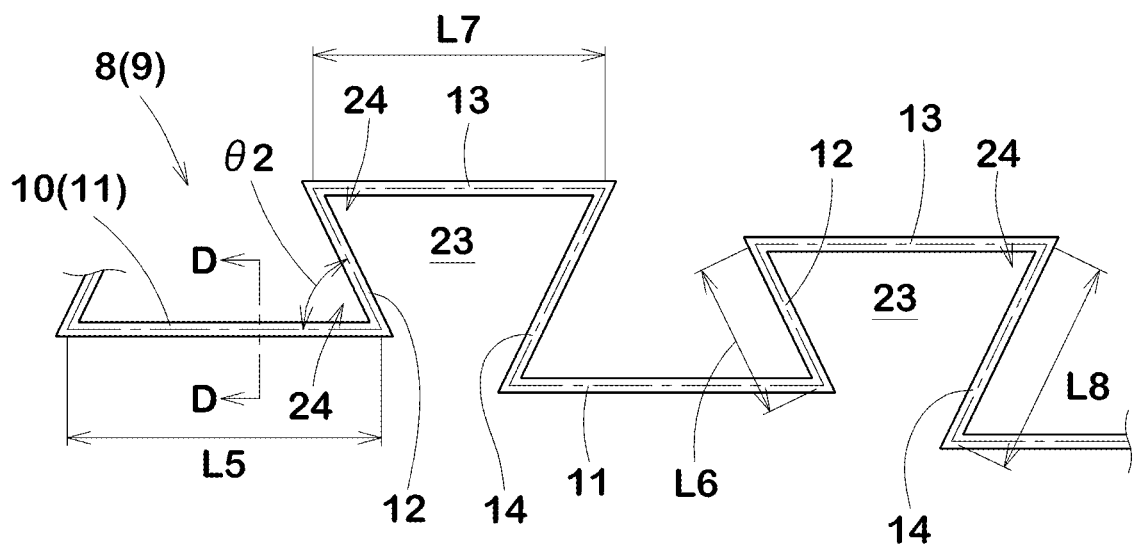
(B)
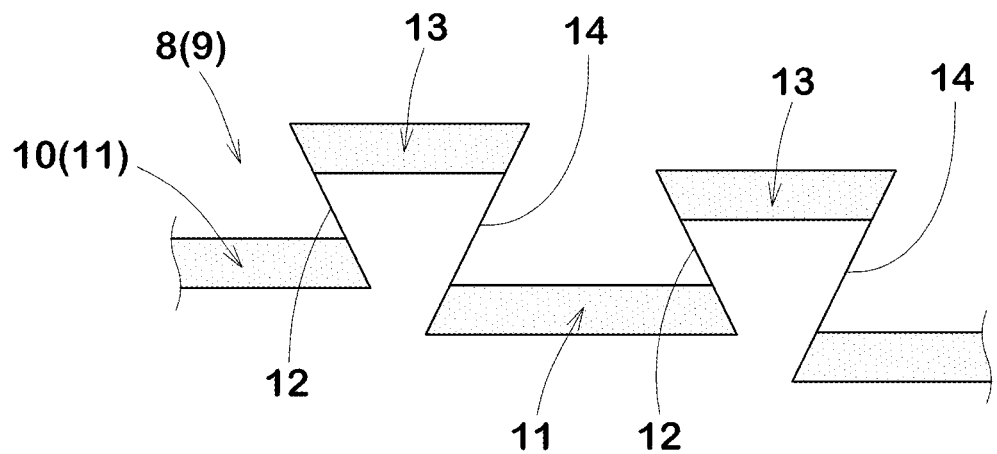

FIG.13
(A)
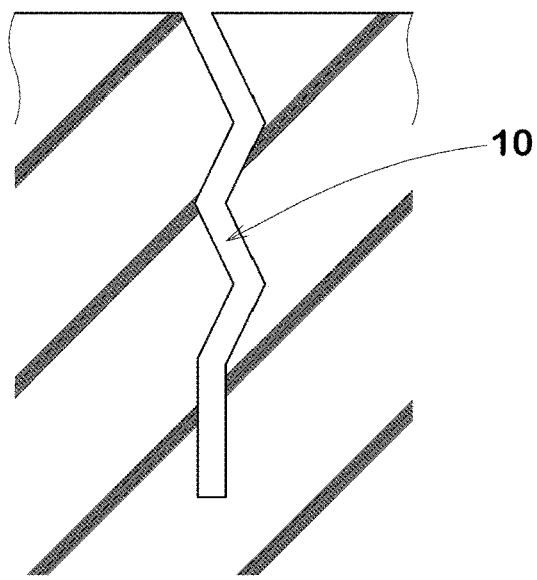
(B)
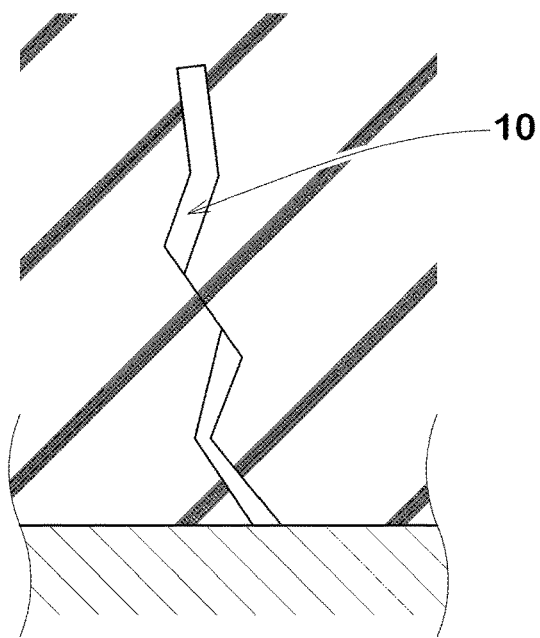

FIG.14
(A)
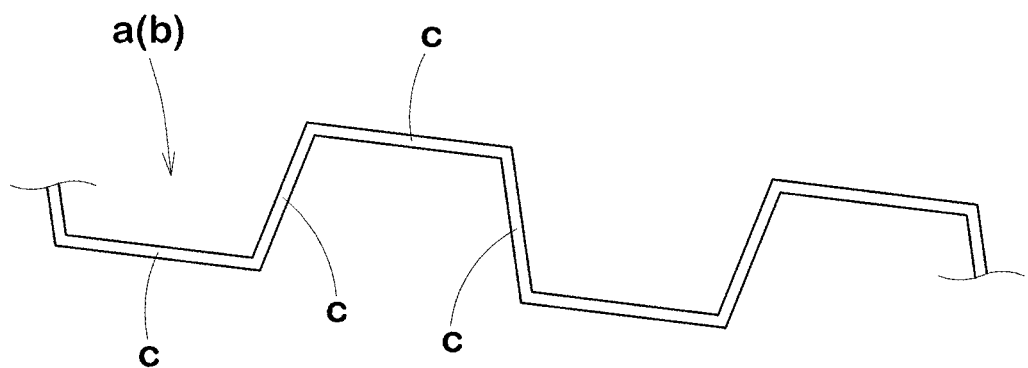
(B)
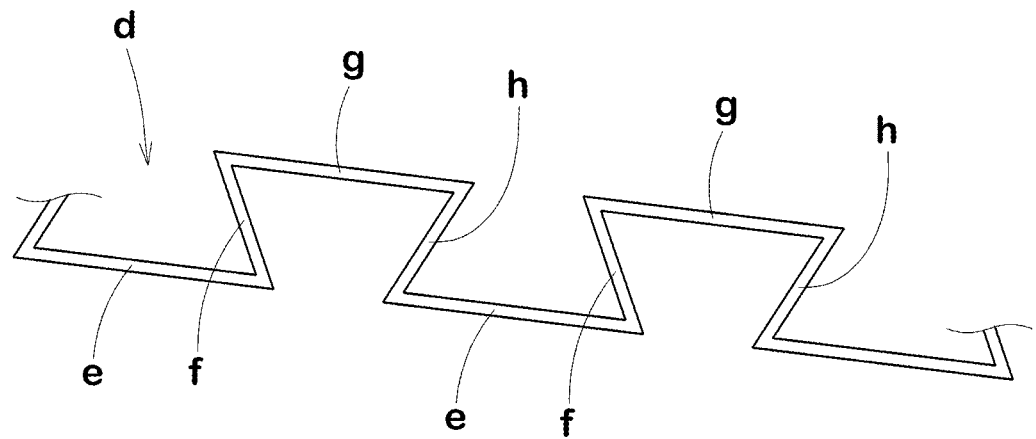

TIRE

TECHNICAL FIELD

The present invention relates to a tire provided, in the tread portion, with sipes.

BACKGROUND ART

In the following Patent Document 1, there is proposed a tire which is provided, in the tread portion, with sipes extending in a tire axial direction. The above-mentioned tire is expected to have improved on-ice performance due to the sipes.

Patent document 1: Japanese Patent Application Publication No. 2018-001803

DISCLOSURE OF THE INVENTION

Problems to be Solved by the Invention

In general, a sipe extending in the axial direction of a tire tends to open widely when it goes out of the ground contact surface of the tread portion as the tire rotates. Such opening of the sipe increases the amount of slip between the edges of the sipe and the road surface, which, therefor, tends to causes uneven wear (for example, heel-and-toe wear) in the vicinities of the edges.

The present invention has been devised in view of the above problem, and a primary objective thereof is to provide a tire capable of exhibiting excellent on-ice performance and uneven wear resistance.

Means of Solving the Problems

The present invention is a tire comprising a tread portion, wherein
the tread portion is provided with a sipe,
the sipe comprises a portion in which a plurality of repeat units are connected in series in the length direction of the sipe,
each of the repeat units is bent so that four sipe segments form acute angles with each other,
the above-said four sipe segments include a first sipe segment extending in a tire axial direction, a second sipe segment extending from an end in a first tire axial direction of the first sipe segment toward a first tire circumferential direction,
a third sipe segment extending in the first tire axial direction from the second sipe segment, and
a fourth sipe segment connected to the third sipe segment and extending from the third sipe segment toward a second tire circumferential direction opposite to the first tire circumferential direction, and
at least one of the first sipe segment and the third sipe segment comprises, in the cross section orthogonal to the length direction, an oscillated portion which extends in a tire radial direction, while oscillating in a lateral direction orthogonal to the above-said length direction.

In the tire of the present invention, it is desirable that each of the first sipe segment and the third sipe segment comprises the oscillated portion.

In the tire of the present invention, it is desirable that the oscillated portion of the first sipe segment and the oscillated portion of the third sipe segment extend in the radial direction of the tire, while oscillating in opposite phases.

In the tire of the present invention, it is desirable that each of the first sipe segment and the third sipe segment extends at an angle of not more than 35 degrees with respect to the tire axial direction.

In the tire of the present invention, it is desirable that the repeat unit is bent so that the four sipe segments form angles of 30 to 70 degrees with each other.

In the tire of the present invention, it is desirable that a linear bottom portion extending parallel to the tire radial direction is connected to an inner side in the tire radial direction of the oscillated portion.

In the tire of the present invention, it is desirable that a length in the tire radial direction of the linear bottom portion is 0.10 to 0.30 times a length in the tire radial direction of the sipe segment to which the linear bottom portion belongs.

In the tire of the present invention, it is desirable that a bending width of the oscillated portion is 0.4 to 1.0 mm.

In the tire of the present invention, it is desirable that the oscillated portion comprises two or more first convex portions which are convex toward one side in the above-said lateral direction.

In the tire of the present invention, it is desirable that the oscillated portion is composed of the above-said two first convex portions and one second convex portion which is convex toward the other side in the lateral direction between the two first convex portions.

In the tire of the present invention, it is desirable that the widthwise centerline of the oscillated portion comprises a first vertex at which the first convex portion is bent, and a second vertex at which the second convex portion is bent,
a virtual straight line drawn between both ends of the above-said center line is parallel to the tire radial direction, and
the second vertex is positioned on the virtual straight line.

In the tire of the present invention, it is desirable that the above-said center line of the oscillated portion includes an outer end on the outer side in the radial direction of the tire and an inner end on the inner side in the radial direction of the tire,
the oscillated portion comprises a first bent element from the outer end to the second vertex and a second bent element from the second vertex to the inner end, and
the length in the tire radial direction of the first bent element is the same as the length in the tire radial direction of the second bent element.

In the tire of the present invention, it is desirable that the first sipe segment extends at an angle of +/−5 degrees with respect to the tire axial direction,
the third sipe segment extends at an angle of +/−5 degrees with respect to the tire axial direction, and
the length of the fourth sipe segment is larger than the length of the second sipe segment.

In the tire of the present invention, it is desirable that the fourth sipe segment extends to the second tire circumferential direction side of a region extended from the first sipe segment toward the first tire axial direction.

In the tire of the present invention, it is desirable that each of the first sipe segment and the third sipe segment extends at an angle of 0 degree with respect to the tire axial direction.

In the tire of the present invention, it is desirable that the length of the fourth sipe segment is 1.10 to 1.50 times the length of the second sipe segment.

In the tire of the present invention, it is desirable that each of the four sipe segments extends in a zigzag shape in the cross section orthogonal to its length direction.

Effects of the Invention

In the repeat units of the sipe provided in the tread portion of the tire of the present invention, since the first sipe segment and the third sipe segment extend in the tire axial direction, the repeat units can provide a large frictional force in the tire circumferential direction when running on ice, and thus improve traction and braking performance on ice. Further, when a shearing force in the tire circumferential direction is applied to the repeat units, the sipe walls facing each other in the second sipe segment and in the fourth sipe segment come into contact with each other, therefore, it is possible to prevent the first sipe segment and the third sipe segment from opening excessively. Such action reduces the amount of slip between the road surface and the edges of the first sipe segment and the third sipe segment when the edges are separated from the road surface. Therefore, uneven wear in the vicinities of the edges is suppressed.

Further, at least one of the first sipe segment and the third sipe segment comprises the oscillated portion which extends in the radial direction of the tire, while oscillating in the lateral direction orthogonal to the length direction of the sipe in the cross section of the sipe orthogonal to the length direction of the sipe. Such oscillated portion maintains the rigidity in the tire circumferential direction of the tread portion since the sipe walls facing each other come into contact with each other and engage with each other when a ground pressure is applied to the tread portion. Therefore, the traction performance and the braking performance on ice are further improved.

BRIEF DESCRIPTION OF THE DRAWING

FIG. 12 (A) is an enlarged view of the repeat units of the sipe, and (B) is an enlarged view of the repeat units when the sipe is opened.

FIG. 13 (A) is a cross-sectional view taken along line D-D of FIG. 12 (A), and (B) is a cross-sectional view of the sipe segment having the cross section shown by (A) during running.

FIG. 14 (A) is an enlarged view of repeat units of a sipe of the comparative example 1, and (B) is an enlarged view of repeat units of a sipe of the comparative example 2.

Figure 1:
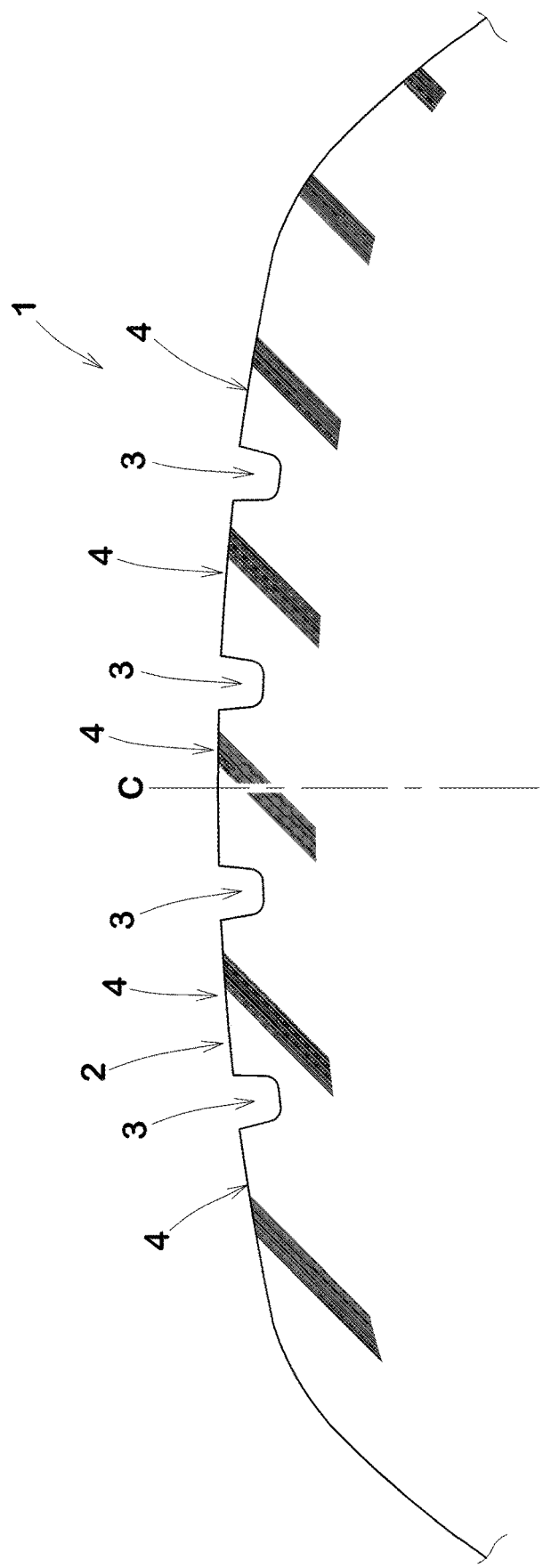
FIG. 1 a cross-sectional view of the tread portion of a tire of an embodiment of the present invention.

DESCRIPTION OF THE REFERENCE SIGNS 2 tread portion
8 sipe
9 repeat unit
10 sipe segment
11 first sipe segment
12 second sipe segment
13 third sipe segment
14 fourth sipe segment
15 oscillated portion

THE BEST MODE FOR CARRYING OUT THE INVENTION

Hereinafter, an embodiment of the present invention will be described on the basis of the drawings.

In FIG. 1, there is shown a cross-sectional view of a tread portion 2 of a tire 1 of the present embodiment. FIG. 1 is a meridian cross-sectional view of the tire 1 including the rotation axis of the tire 1 under a normal state. The tire 1 of the present embodiment is suitably used as, for example, a pneumatic tire for a passenger car. However, the present invention is not limited to such embodiment, and the tire 1 of the present invention may be used, for example, for a heavy load.

The "normal state" is a no-load state in which the tire is mounted on a normal rim and is filled with a normal internal pressure. Hereinafter, unless otherwise noted, dimensions and the like of any part of the tire are values measured in the normal state.

The "normal rim" means a rim specified for each tire in a standard system including a standard on which the tire is based, for example, "standard rim" in JATTA, "Design Rim" in TRA, "Measuring Rim" in ETRTO.

The "normal internal pressure" means an air pressure specified for each tire in a standard system including a standard on which the tire is based, i.e. "maximum air pressure" in JATMA, a the maximum value described in the table "TIRE LOAD LIMITS AT VARIOUS COLD INFLATION PRESSURES" in TRA, and "INFLATION PRESSURE" in ETRTO.

As shown in FIG. 1, the tread portion 2 is provided with, for example, a plurality of main grooves 3 continuously extending in the tire circumferential direction, and land portions 4 divided thereby.

Figure 2:
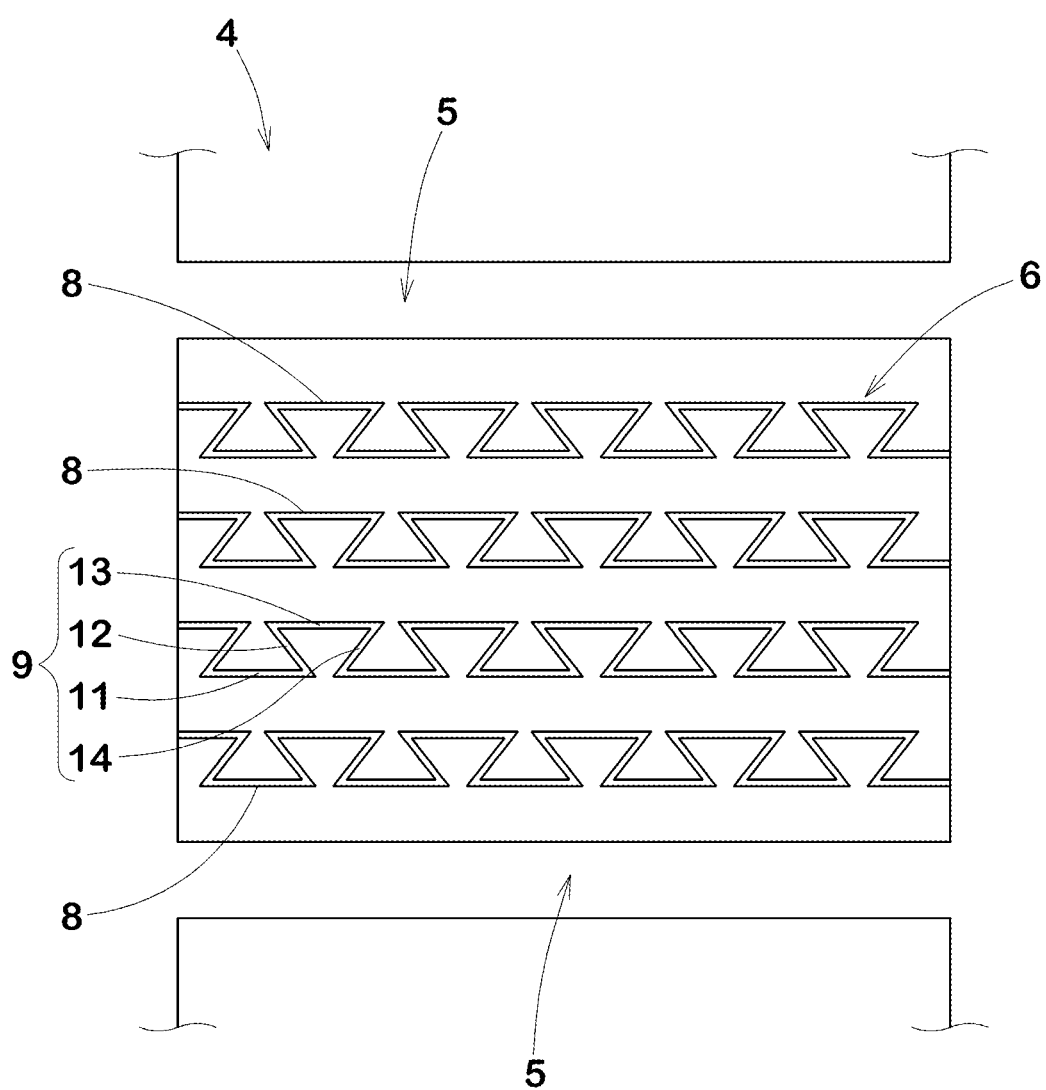
FIG. 2 an enlarged plan view of a land portion of FIG. 1.

In FIG. 2, there is shown an enlarged plan view of a land portion 4.

As shown in FIG. 2, the land portion 4 of the present embodiment is configured as, for example, a block row including a plurality of blocks 6 in the tire circumferential direction. The blocks 6 are divided between lateral grooves 5 which cross the land portion 4 in the tire axial direction.

Figure 3:
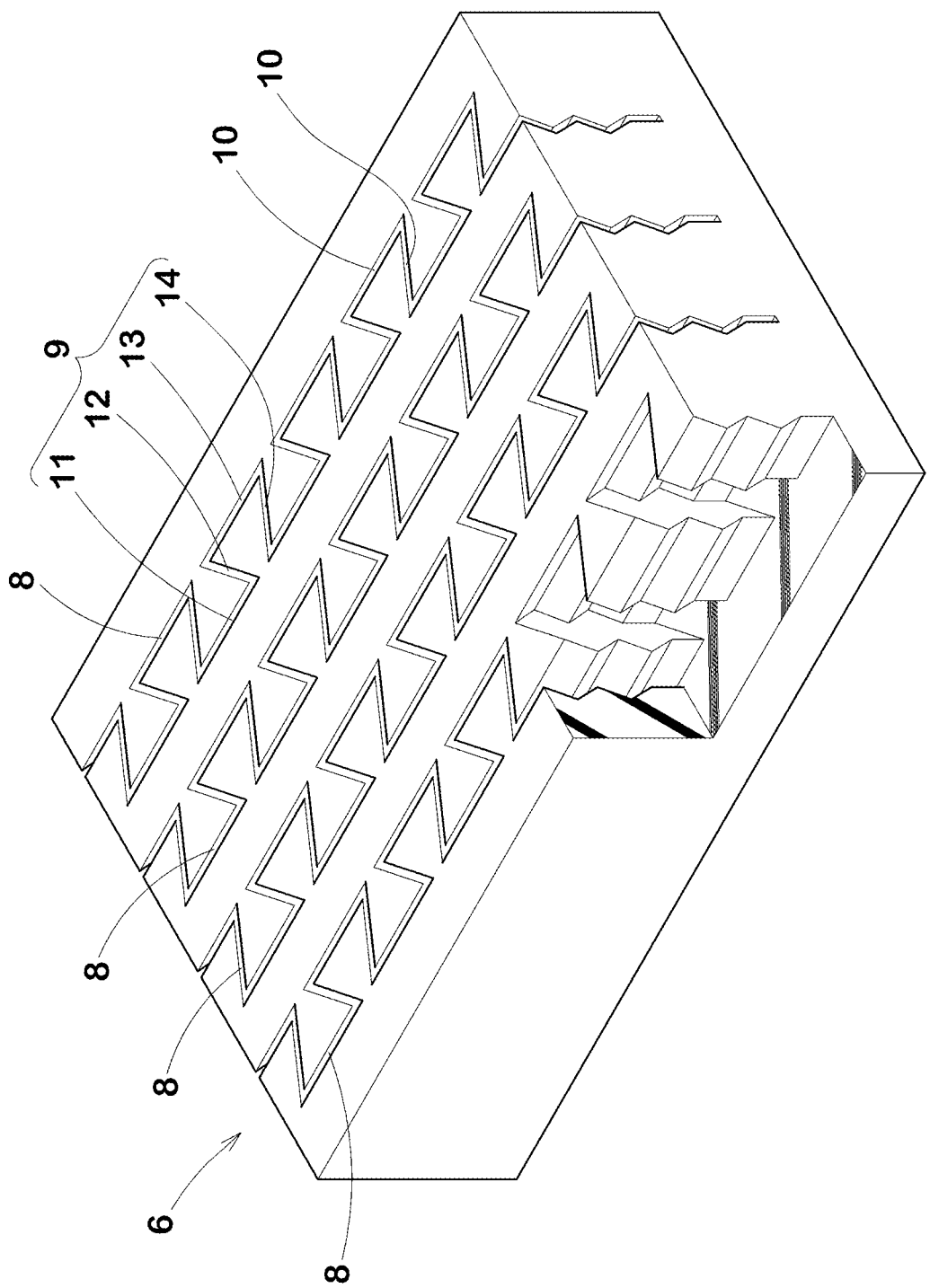
FIG. 3 an enlarged perspective view of the block of FIG. 2.

In FIG. 3, there is shown an enlarged perspective view of a block 6. Incidentally, in FIG. 3, a part of the block 6 is cut out so that the invention can be easily understood. As shown in FIG. 3, the ground contacting surface of the tread portion 2 is provided with a plurality of sipes 8.

In this embodiment, a plurality of the sipes 8 are provided per one block 6. However, the present invention is not limited to such blocks, and for example, the sipe 8 may be provided on a rib continuously extending in the tire circumferential direction.

In the present specification, "sipe" means a cut having a width of not more than 1.5 mm. It is desirable that the width of the sipe 8 is 0.2 to 0.5 mm, for example.

The sipe 8 comprises a portion in which a plurality of repeat units 9 are connected in series in the length direction of the sipe 8.

Each of the repeat units 9 is bent so that four sipe segments 10 form acute angles with each other. Further, the four sipe segments 10 include a first sipe segment 11, a second sipe segment 12, a third sipe segment 13 and a fourth sipe segment 14.

Figure 4:
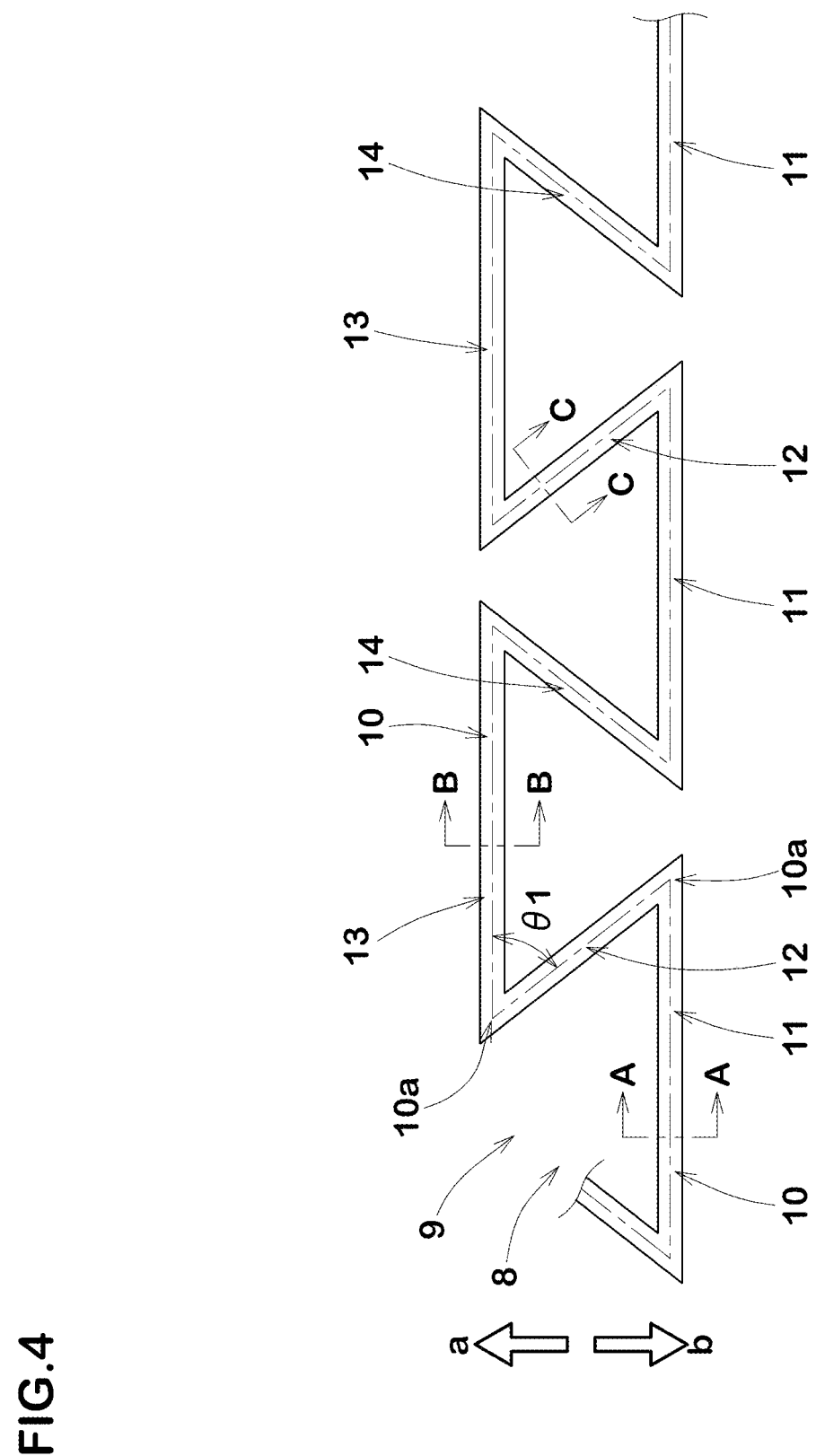
FIG. 4 an enlarged view of repeat units of a sipe of FIG. 3.

In FIG. 4, there are shown an enlarged view of the repeat units 9.

As shown in FIG. 4, the first sipe segment 11 extends in the tire axial direction.

The second sipe segment 12 extends from an end in a first tire axial direction (rightward in FIG. 4) of the first sipe segment 11 toward a first tire circumferential direction "a" (upward in FIG. 4).

The third sipe segment 13 extends in the first tire axial direction from the second sipe segment 12.

The fourth sipe segment 14 is connected to the third sipe segment 13, and extends from the third sipe segment 13 toward a second tire circumferential direction "b" (downward in FIG. 4) which is opposite to the first tire circumferential direction.

In the repeat units 9 of the sipe 8 of the present invention, since the first sipe segments 11 and the third sipe segments 13 extend in the tire axial direction, it is possible to provide a large frictional force in the tire circumferential direction when running on ice, and thereby traction performance and braking performance on ice can be improved.

Figure 5:
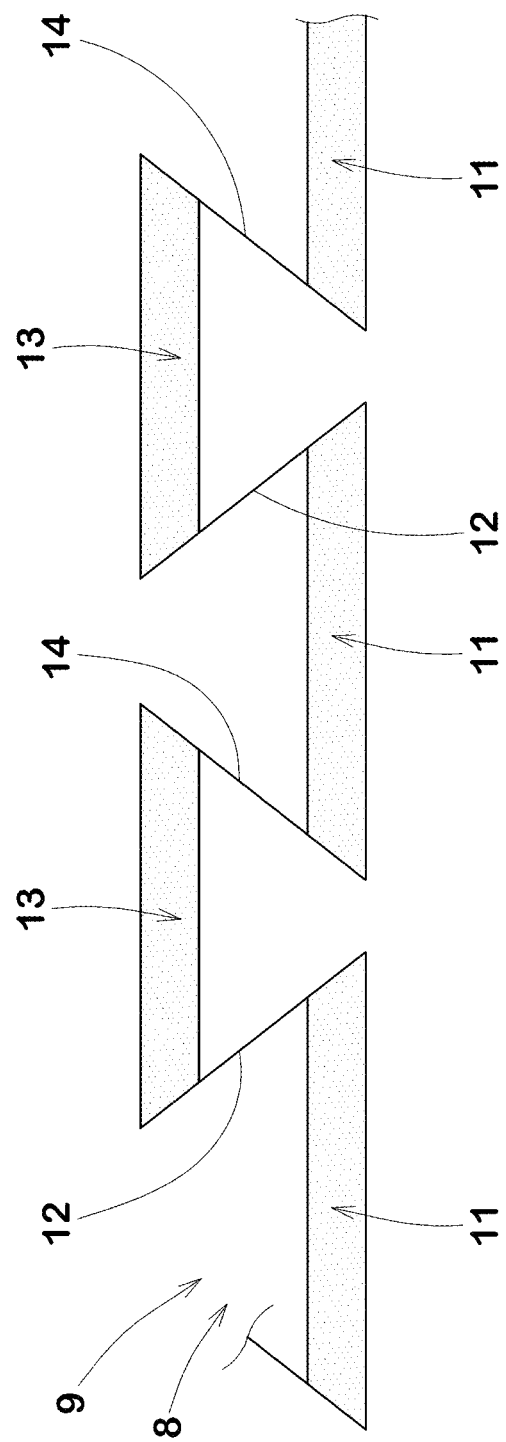
FIG. 5 an enlarged view of the repeat units when the sipe is opened.

In FIG. 5, there is shown an enlarged view of the repeat units 9 when the sipe 8 is opened. In FIG. 5, the opened areas of the repeat units 9 are colored so that the invention can be easily understood.

As shown in FIG. 5, in the repeat units 9, when a shearing force in the tire circumferential direction is applied thereto, the sipe walls facing each other in the second sipe segment 12 and in the fourth sipe segment 14 come into contact with each other, and thus it is possible to prevent the first sipe segment 11 and the third sipe segment 13 from opening excessively. such action reduces the amount of slip between the road surface and the edges of the first sipe segment 11 and the third sipe segment 13 when the edges come free from the road surface. Therefore, uneven wear in the vicinities of the edges is suppressed.

Figure 6:
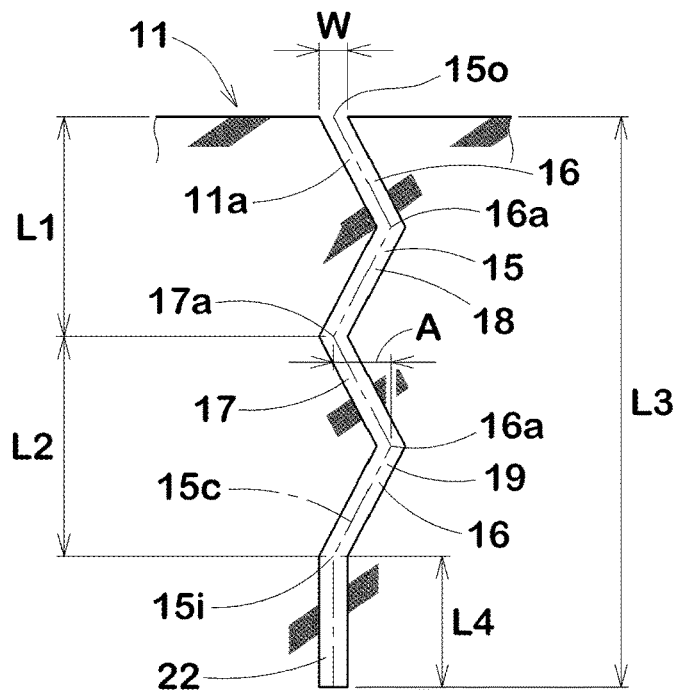
FIG. 6 a cross-sectional view taken along line A-A of FIG. 4.
Figure 7:
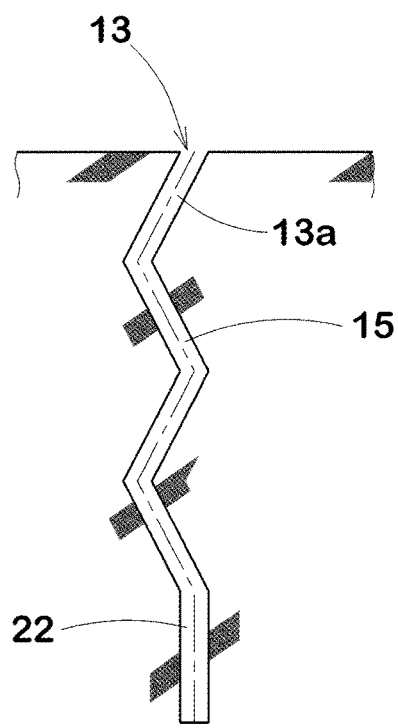
FIG. 7 a cross-sectional view taken along line B-B of FIG. 4.

In FIG. 6, there is shown a cross-sectional view of the first sipe segment 11 taken along line A-A of FIG. 4. In FIG. 7, there is shown a cross-sectional view of the third sipe segment 13 taken along line B-B of FIG. 4.

As shown in FIG. 6 and FIG. 7, at least one of the first sipe segment 11 and the third sipe segment 13 comprises an oscillated portion 15 extending in a tire radial direction, while oscillating in a lateral direction orthogonal to the above-said length direction in the cross section orthogonal to the above-said length direction.

In this embodiment as a desirable embodiment, each of the first sipe segment 11 and the third sipe segment 13 comprises the oscillated portion 15.

When the ground pressure acts on the tread portion 2, since the sipe walls facing each other come into contact with each other and engage with each other, such oscillated portion 15 maintains the rigidity of the tread portion 2 in the tire circumferential direction. Therefore, the traction performance and the braking performance on ice are further improved. In addition, such oscillated portion 15 also improves steering stability on a dry road surface.

As shown in FIG. 4, the first sipe segment 11 and the third sipe segment 13 extend at an angle of not more than 35 degrees with respect to the tire axial direction, for example. The angles of the first sipe segment 11 and the third sipe segment 13 with respect to the tire axial direction are desirably not more than 15 degrees, and more desirably not more than 5 degrees.

The first sipe segment 11 and the third sipe segment 13 of the present embodiment as a more desirable embodiment extend parallel to the tire axial direction.

It is desirable that the length of the first sipe segment 11 is the same as the length of the third sipe segment 13.

Further, it is desirable that the length of the second sipe segment 12 and the length of the fourth sipe segment 14 are smaller than, for example, the length of the first sipe segment 11 or the length of the third sipe segment 13.

In the present embodiment, the length of the second sipe segment 12 is the same as the length of the fourth sipe segment 14.

The repeat unit 9 of the present embodiment is bent so that the four sipe segments 10 form angles θ1 of 30 to 70 degrees with each other. It is more desirable that the angle θ1 is 30 to 40 degrees.

When the angles of the acute-angled portions 10a formed by the respective sipe segments 10 are smaller than 30 degrees, the acute-angled portions 10a may be reduced in the rigidity, and tend to be reduced in the effect of suppressing the opening and displacement of the sipe 8. And there is a possibility that the frictional force in the tire axial direction provided by the repeat units 9 is reduced.

Further, when the angles are larger than 70 degrees, the effect of suppressing the opening of the sipe 8 by the second sipe segment 12 and the fourth sipe segment 14 tends to become small. In the present embodiment, the angles of the acute-angled portions 10a formed by the respective sipe segments 10 are all the same. However, the present invention is not limited to such embodiment.

As shown in FIG. 6 and FIG. 7, it is desirable that each of the oscillated portions 15 extends in the tire radial direction in a zigzag shape from the outer surface of the tread portion 2. However, the present invention is not limited to such example, and each of the oscillated portions 15 may extend in a sinusoidal shape in the tire radial direction, for example.

The oscillated portion 15 of the first sipe segment 11 and the oscillated portion 15 of the third sipe segment 13 are formed to have the same wavelength of oscillation and amplitude of oscillation.

In a desirable example, the oscillated portion 15 of the first sipe segment 11 and the oscillated portion 15 of the third sipe segment 13 extend in the radial direction of the tire while oscillating in opposite phases to each other.

Figure 8:
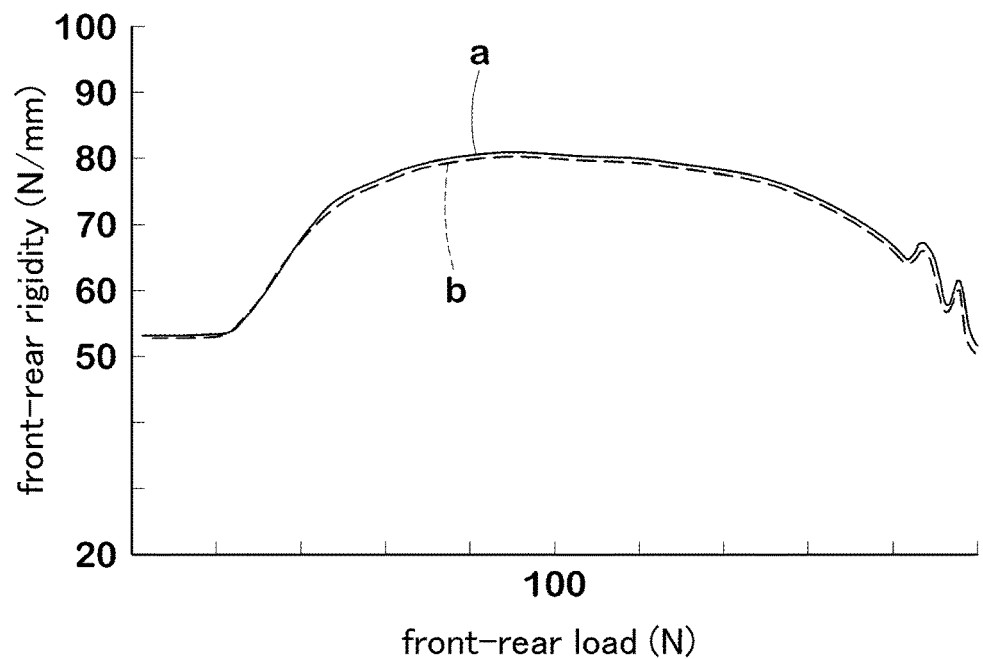
FIG. 8 a graph which shows the rigidity of a block when the oscillated portion of the first sipe segment and the oscillated portion of the third sipe segment oscillate in opposite phases.

In FIG. 8, there is shown a graph which shows the rigidity of the block 6 (shown in FIG. 2) when the oscillated portion 15 of the first sipe segment 11 and the oscillated portion 15 of the third sipe segment 13 oscillate in opposite phases as described above.

Figure 9:
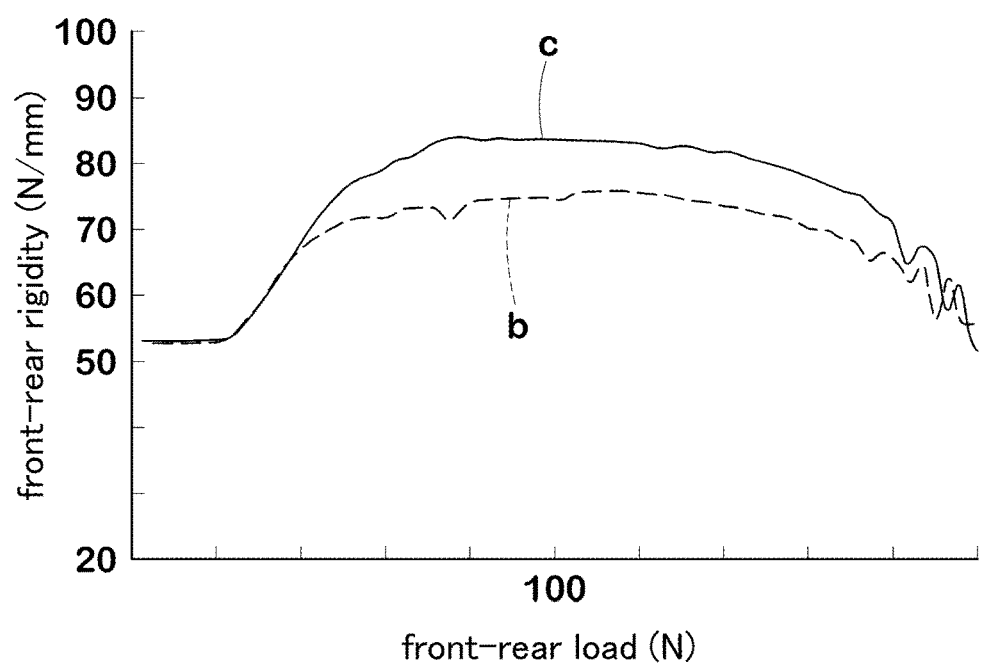
FIG. 9 a graph which shows the rigidity of a block when the oscillated portion of the first sipe segment and the oscillated portion of the third sipe segment oscillate in the same phase.

In FIG. 9, there is shown a graph which shows the rigidity of the block 6 when the oscillated portion 15 of the first sipe segment 11 and the oscillated portion 15 of the third sipe segment 13 oscillate in the same phase.

In FIG. 8 and FIG. 9, the horizontal axis represents the load in the tire circumferential direction acting on the block 6, and the vertical axis represents the rigidity in the tire circumferential direction of the block 6.

Further, the graph "a" of FIG. 8 and the graph "c" of FIG. 9 which are drawn by solid line, show the rigidity of the block 6 at the time of traction, and the graph "b" of FIG. 8 and the graph "d" of FIG. 9 which are drawn by broken line, show the rigidity of the block 6 at the time of braking.

As shown in FIG. 8, it can be understood that, in the present embodiment, the rigidity of the block 6 during traction and during braking, is similar. In this way, in the present embodiment, the oscillated portion 15 of the first sipe segment 11 and the oscillated portion 15 of the third sipe segment 13 extend in the tire radial direction while oscillating in opposite phases, therefore, the rigidity of the block 6 is unlikely to have anisotropy in the tire circumferential direction. Therefore, the tire of the present invention can be uniformly improved in the traction performance and the braking performance. Thus, in the tire of the present invention, for example, the tread pattern can be made non-directional.

On the other hand, as shown in FIG. 9, when the first sipe segment 11 and the third sipe segment 13 oscillate in the same phase, the maximum values of the graph "c" and the graph "d" are different from each other by about 15%, and it can be understood that the rigidity of the block is different between at the time of the traction and at the time of braking. That is, in this embodiment, since both the first sipe segment 11 and the third sipe segment 13 increase the rigidity of the block 6 on one side in the tire circumferential direction, the rigidity on the other side in the tire circumferential direction becomes relatively low, and as a result, the rigidity of the block 6 tends to have anisotropy in the tire circumferential direction.

In the present embodiment in which the third sipe segment 13 is arranged on the first tire circumferential direction "a" side of the first sipe segment 11 as shown in FIG. 4, it is desirable that the oscillating-start portion 11a (shown in FIG. 6) of the first sipe segment 11 which is on the most tread surface side, is inclined to the second tire circumferential direction "b" side toward the inside in the radial direction of the tire.

Similarly, it is desirable that the oscillating-start portion 13a (shown in FIG. 7) of the third sipe segment 13 which is on the most tread surface side, is inclined to the first tire circumferential direction "a" side toward the inside in the radial direction of the tire.

In other words, the oscillating-start portion 11a of the first sipe segment 11 and the oscillating-start portion 13a of the third sipe segment 13 are inclined in such directions that these are separated from each other toward the inside in the radial direction of the tire.

Since a large rubber volume of the rubber piece surrounded by the sipe segments is secured, it is possible to suppress the rubber chipping at the time of demolding in the manufacturing process. Thereby, a large rubber volume of the rubber piece surrounded by the sipe segments is secured, therefore, it is possible to suppress rubber chipping during demolding in the manufacturing process.

As shown in FIG. 6, it is desirable that the oscillated portion 15 comprises two or more first convex portions 16 which are convex toward one side in the lateral direction. The oscillated portion 15 of the present embodiment is composed of the two first convex portions 16 and one second convex portion 17 which is convex toward the other side in the lateral direction between the two first convex portions 16.

Such oscillated portion 15 effectively suppresses shear deformation of the block 6 when the sipe walls come into contact with each other.

The widthwise center line 15c of the oscillated portion 15 has a first vertex 16a at which a first convex portion 16 is bent, and a second vertex 17a at which a second convex portion 17 is bent.

Further, it is desirable that a virtual straight line (not shown) drawn between both ends of the center line 15c of the oscillated portion 15 is parallel to the tire radial direction. Further, it is desirable that the second vertex 17a is positioned on the virtual straight line.

As a result, the anisotropy of the rigidity of the block 6 in the tire circumferential direction is controlled.

Further, the knife blade of the vulcanization mold forming the oscillated portion 15 is not easily deformed when it comes into contact with the raw rubber of the tire during vulcanization molding, and excellent moldability can be obtained.

The center line 15c of the oscillated portion 15 has an outer end 15o on the outer side in the radial direction of the tire and an inner end 15i on the inner side in the radial direction of the tire.

The oscillated portion 15 comprises a first bent element 18 from the outer end 15o to the second vertex 17a and a second bent element 19 from the second vertex 17a to the inner end 15i. It is desirable that the length L1 in the tire radial direction of the first bent element 18 is 0.8 to 1.2 times the length L2 in the tire radial direction of the second bent element 19. In the present embodiment, the length L1 is the same as the length L2. Such oscillated portion 15 can uniformly improve the traction performance and the braking performance on ice.

If a bending width "A" of the oscillated portion 15 is small, the rigidity of the block 6 may not be sufficiently improved. On the other hand, if the bending width "A" of the oscillated portion 15 is large, the bending of the block 6 when a vertical load is applied to the ground contacting surface of the block 6 increases, and there is a possibility that the steering stability on dry roads is deteriorated.

Further, if the bending width "A" is large, the demolding of the knife blade of the vulcanization mold forming the bending width "A", at the time of vulcanization molding, tends to deteriorate. From this point of view, the bending width "A" of the oscillated portion 15 is, for example, 0.4 to 1.0 mm. Incidentally, the bending width "A" is the distance in the lateral direction from the first vertex 16a to the second vertex 17a.

It is desirable that, on the inside in the tire radial direction of the oscillated portion 15, there is provided a linear bottom portion 22 extending therefrom in parallel to the tire radial direction. Thereby, at the time of vulcanization molding, the knife blade of the vulcanization mold forming the oscillated portion 15 easily penetrates into the raw rubber of the tire, and the deformation and damage of the knife blade are suppressed.

From the point of view of achieving both on-ice performance of the tire and moldability during vulcanization molding of the tire, it is desirable that the length L4 in the tire radial direction of the linear bottom portion 22 is 0.10 to 0.30 times the length L3 in the tire radial direction of the sipe segment 10 to which the linear bottom portion 22 belongs.

Figure 10:
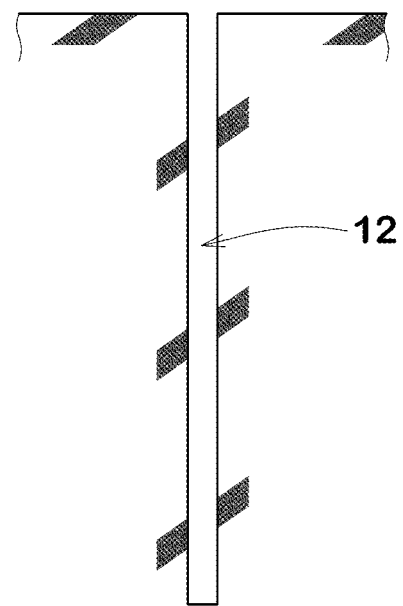
FIG. 10 a cross-sectional view taken along line C-C of FIG. 4.

In FIG. 10, there is shown a cross-sectional view of the second sipe segment 12 taken along line C-C of FIG. 4. As shown in FIG. 10, it is desirable that the second sipe segment 12 extends linearly in the radial direction of the tire. The same applies to the fourth sipe segment 14. Thereby, when the first sipe segment 11 and the third sipe segment 13 are opened, the sipe walls of the second sipe segment 12 and of the fourth sipe segment 14 are easily brought into close contact with each other with a broad surface, therefore, the rigidity of the block 6 in the tire circumferential direction is improved.

If the second sipe segment 12 and the fourth sipe segment 14 extend in a zigzag shape in the radial direction of the tire, there is a possibility that the gap between the sipe walls facing each other becomes large, and the rigidity of the block 6 in the tire circumferential direction is decreased.

Incidentally, by using a knife blade including a portion extending in a zigzag shape, the sipe 8 of the present embodiment can be vulcanization molded through a well-known method.

Figure 11:
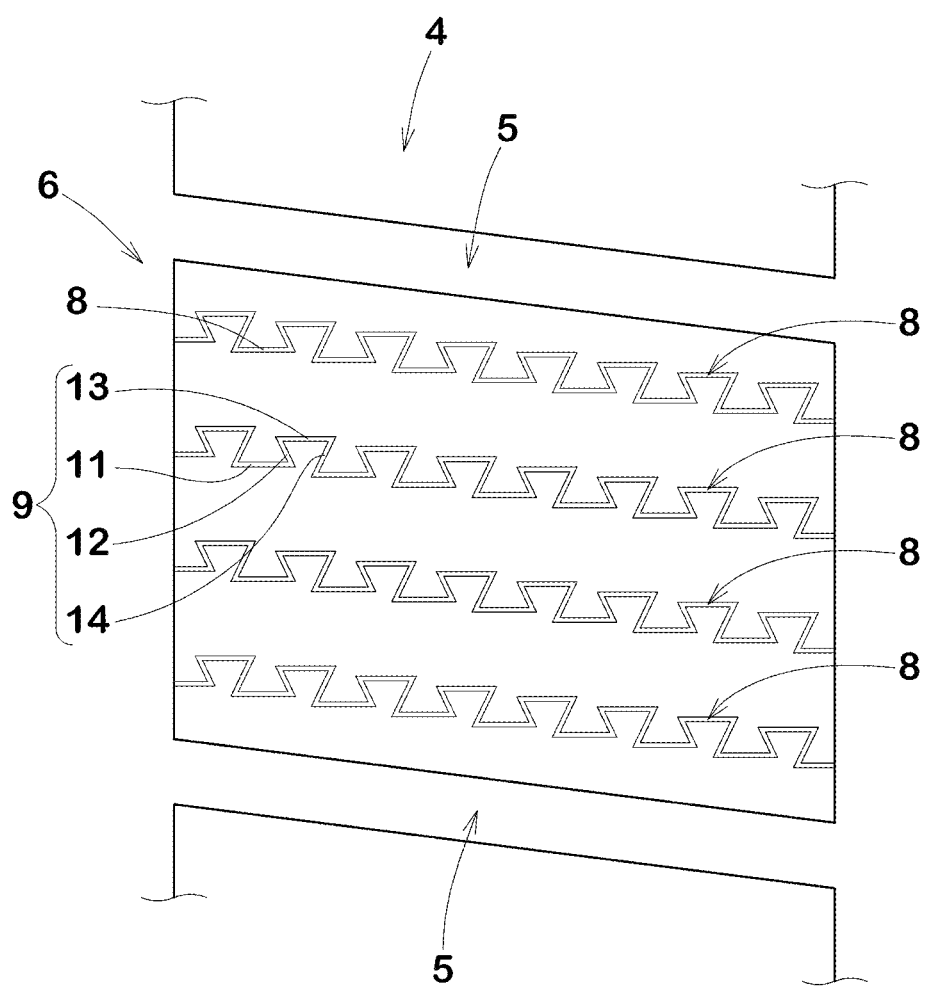
FIG. 11 an enlarged plan view of a land portion of another embodiment of the present invention.

In FIG. 11, there is shown an enlarged plan view of a land portion 4 of another embodiment of the present invention. In this embodiment, elements common to the above-described embodiment are denoted by the same reference numerals, and the descriptions thereof are omitted here.

In FIG. 12 (A), there is shown an enlarged view of repeat units 9. As shown in FIG. 12 (A), the first sipe segment 11 extends at an angle of +/−5 degrees with respect to the tire axial direction, for example.

The third sipe segment 13 is connected in series to the second sipe segment 12, and extends at an angle of +/−5 degrees with respect to the tire axial direction.

In the repeat units 9 of this embodiment, since the first sipe segment 11 and the third sipe segment 13 extend at the angle of +/−5 degrees in the tire axial direction, a large friction in the tire circumferential direction is provided when running on ice, and thereby, the traction on ice can be increased.

In order to ensure such increased traction on ice, it is desirable that each of the first sipe segment 11 and the third sipe segment 13 extends at an angle of +/−3 degrees with respect to the tire axial direction.

As a more desirable example, each of the first sipe segment 11 and the third sipe segment 13 of the present embodiment extends at an angle of 0 degree with respect to the tire axial direction.

In FIG. 12 (B), there is shown an enlarged view of the repeat units 9 when the sipe 8 is opened. In FIG. 12 (B), the opened areas of the sipe 8 are colored so that the invention can be easily understood.

As shown in FIG. 12 (B), in the repeat units 9, when a shearing force in the tire circumferential direction is applied thereto, the sipe walls facing each other in the second sipe segment 12 and in the fourth sipe segment 14 come into contact with each other, and thus it is possible to prevent the first sipe segment 11 and the third sipe segment 13 from opening excessively. Such action reduces the amount of slip between the road surface and the edges of the first sipe segment 11 and the third sipe segment 13 when the edges come out from the ground contact surface of the tread portion 2 as the tire rotates. Therefore, uneven wear in the vicinities of the edges is suppressed.

As shown in FIG. 12 (A), in this embodiment, the length L8 of the fourth sipe segment 14 is larger than the length L6 of the second sipe segment 12. Therefore, when a shear force acts on the repeat units 9, there is a tendency that the amount of shear deformation along the sipe walls of the fourth sipe segment 14 becomes larger than the amount of shear deformation along the sipe walls of the second sipe segment 12. As a result, the second sipe segment 12 and the fourth sipe segment 14 and a land piece 23 therebetween tend to cause twisting deformation when the ground pressure is applied. Therefore, the sipe walls of the second sipe segment 12 and/or the fourth sipe segment 14 can be strongly pressed against each other. Owing to this action, the opening of the first sipe segment 11 and the third sipe segment 13 can be further suppressed.

It is desirable that the length L6 of the second sipe segment 12 is smaller than the length L5 of the first sipe segment 11 and the length L7 of the third sipe segment 13 in order to secure traction on ice.

Similarly, it is desirable that the length L8 of the fourth sipe segment 14 is smaller than the length L5 of the first sipe segment 11 and the length L7 of the third sipe segment 13. In this specification, it is desirable that the length of each sipe segment is measured, for example, at the center line of the sipe.

It is desirable that the fourth sipe segment 14 extends to the second tire circumferential direction side of a region extended toward the first tire axial direction from the first sipe segment 11 which is connected to the fourth sipe segment 14 through the second sipe segment 12 and the third sipe segment 13. Thereby, the end on the second tire circumferential direction side of the fourth sipe segment 14 is located on the second tire circumferential direction side of the first sipe segment 11. The sipe 8 having a plurality of such repeat units 9 can be arranged in an oblique direction, for example, to accord to a shape of the block, while securing a tire axial component by the first sipe segments 11 and the third sipe segments 13. Therefore, the sipe of the present invention can provide large traction on ice even when arranged in an oblique direction.

The length L4 of the fourth sipe segment 14 is preferably not less than 1.10 times, more preferably not less than 1.20 times, and preferably not more than 1.50 times, more preferably not more than 1.40 times the length L2 of the second sipe segment 12.

In the case of the repeat unit 9 having such fourth sipe segment 14, it is possible to increase the arrangement angle of the overall sipe with respect to the tire axial direction, while ensuring the traction on ice.

In this embodiment, the acute-angled portions 24 formed by the four sipe segments 10 are, for example, arranged at the same angle with each other. However, the acute-angled portions 24 are not limited to such example, and the angles may be different.

It is desirable that the angles θ2 of the acute-angled portions 24 are, for example, not less than 45 degrees. Specifically, the angles θ2 of the acute-angled portions 24 are preferably 50 to 80 degrees.

Such repeat unit 9 can secure an appropriate distance in the tire circumferential direction between the first sipe segment 11 and the third sipe segment 13, while exerting the above-mentioned effects, and can further increase the uneven wear resistance.

It is desirable that, as shown in FIG. 11, the arrangement angle of the sipe 8 is, for example, 5 to 15 degrees. Such sipe 8 can provide a large frictional force in the tire circumferential direction.

The arrangement angle of the sipe 8 is an angle with respect to the tire axial direction, of a straight line connecting between ends of the first sipe segments 11 which ends are adjacent to each other in the tire axial direction.

In FIG. 13 (A), there is shown a cross-sectional view taken along line D-D of FIG. 12 (A). FIG. 13 (A) is a figure showing a cross section orthogonal to the length direction of each sipe segment 10.

It is desirable that as shown in FIG. 13 (A), each of the four sipe segments 10 extends in the tire radial direction in a zigzag shape in the cross section orthogonal to the length direction thereof.

In FIG. 13 (B), there is shown a cross-sectional view of the sipe segment 10 having the cross section shown in FIG. 13 (A) during running.

When loads in the tire radial direction and the tire circumferential direction are applied to the sipe segment 10 having the above cross-sectional shape, then as shown in FIG. 13 (B), the sipe walls come into contact with each other and supports each other.

Owing to this action, the deformation of the block is suppressed, and excellent steering stability can be obtained.

Incidentally, by employing a well-known method, a sipe having such a shape can be vulcanization molded by the use of a vulcanization mold having a sipe blade extending in a zigzag shape in the depth direction of the sipe.

In the sipe segment 10 having the above-said cross-sectional shape, it is desirable that the maximum width of the zigzag amplitude is, for example, 2.0 to 3.0 times the opening width of the sipe. Thereby, damage to the tread rubber when the sipe blade is pulled out during vulcanization molding, is suppressed.

Although the tire of an embodiment of the present invention has been described in detail above, the present invention is not limited to the specific embodiment described above, and can be modified into various embodiments.

WORKING EXAMPLES

Pneumatic tires of size 195/65R15 provided with the above-described sipes were experimentally manufactured based on specifications shown in Table 1.

As a comparative example 1, a tire in which the sipe did not have an oscillated portion and the entire sipe extended linearly in the radial direction of the tire, was experimentally manufactured.

All the test tires had substantially the same configuration, except for the shape of the sipe.

Each test tire was tested for traction performance on ice, braking performance on ice, cornering performance on ice, steering stability on dry roads, and uneven wear resistance. specifications common to all the test tires and test methods are as follows.

wheel rim: 15×6.0 JJ

Tire pressure: front 230 kPa, rear 230 kPa

Test vehicle: displacement 1500 cc, front-wheel drive vehicle

Tire mounting positions: all wheels

<Traction Performance on Ice>

Traction performance when the test vehicle provided with the respective test tires was running on an icy road, was evaluated by the driver's feelings. The result is a score based on the traction performance of the comparative example 1 being 100, wherein the larger the value, the better the traction performance on ice.

<Braking Performance on Ice>

Braking performance when the test vehicle provided with the respective test tires was running on an icy road, was evaluated by the driver's feelings. The result is a score based on the braking performance of the comparative example 1 being 100, wherein the larger the value, the better the braking performance on ice.

<Cornering Performance on Ice>

Cornering performance when the test vehicle provided with the respective test tires was running on an icy road, was evaluated by the driver's feelings. The result is a score based on the cornering performance of the comparative example 1 being 100, wherein the larger the value, the better the cornering performance on ice.

<Steering Stability on Dry Roads>

Steering stability when the test vehicle provided with the respective test tires was running on a dry road surface, was evaluated by the driver's feelings. The result is a score based on the steering stability of the comparative example 1 being 100, wherein the larger the value, the better the steering stability on dry roads.

<Uneven Wear Resistance>

By the use of a wear energy measuring device, the wear energy of the sipe edge of each test tire was measured. The result is a reciprocal of the wear energy indicated by an index based on the comparative example 1 being 100, wherein the larger the value, the smaller the wear energy and the better the uneven wear resistance.

The test results are shown in Table 1.

TABLE 1

|  | comparative example 1 | working example 1 | working example 2 | working example 3 | working example 4 | working example 5 | working example 6 | working example 7 | working example 8 |
|---|---|---|---|---|---|---|---|---|---|
| presence/absence of oscillated portion | absence | presence | presence | presence | presence | presence | presence | presence | presence |
| angle θ1 of angled portion (deg.) | 35 | 35 | 20 | 70 | 85 | 35 | 35 | 35 | 35 |
| bending width A of oscillated portion (mm) | 0 | 0.6 | 0.6 | 0.6 | 0.6 | 0.2 | 0.4 | 1.0 | 1.2 |
| traction performance on ice (score) | 100 | 108 | 104 | 105 | 101 | 101 | 105 | 107 | 106 |
| brake performance on ice (score) | 100 | 110 | 104 | 106 | 101 | 101 | 106 | 107 | 107 |
| cornering performance on ice (score) | 100 | 110 | 104 | 110 | 110 | 110 | 110 | 110 | 110 |
| steering stability on dry roads (score) | 100 | 106 | 98 | 106 | 106 | 101 | 105 | 103 | 101 |
| uneven wear resistance performance (index) | 100 | 106 | 105 | 104 | 103 | 103 | 104 | 106 | 105 |

From the test results, it was confirmed that the working example tires exhibited excellent on-ice performance and uneven wear resistance. Further, it was confirmed that the working example tires had improved steering stability on dry roads.

Pneumatic tires of size 185/65R15 provided with the above-described sipes were experimentally manufactured based on specifications shown in Table 1.

As a comparative example 2, a tire having a sipe "a" comprising a plurality of repeat units "b" shown in FIG. 14 (A) was experimentally manufactured. The repeat units "b" shown in FIG. 14 (A) are bent in a trapezoidal wavy shape so that sipe segments "c" form obtuse angles with each other.

As a comparative example 3, a tire having a sipe "d" shown in FIG. 14 (B) was experimentally manufactured. In the sipe "d", the first sipe segment "e" and the third sipe segment "g" were inclined at about 7 degrees with respect to the tire axial direction, and the second sipe segment "f" and the fourth sipe segment "h" had the same length as each other.

All the test tires had substantially the same configuration, except for the shape of the sipe. Each test tire was tested for traction on ice, uneven wear resistance, and steering stability on dry roads.

Specifications common to all the test tires and test methods are as follows.

Wheel rim: 15×6.0 J
Tire pressure: front 220 kPa, rear 210 kPa
Test vehicle: displacement 1300 cc, front-wheel drive vehicle
Tire mounting positions: all wheels <Traction on Ice>

Traction when the test vehicle provided with the respective test tires was running on an icy road, was evaluated by the driver's feelings. The result is a score based on the traction on ice of the comparative example 2 being 100, wherein the larger the value, the better the traction on ice.

<Uneven Wear Resistance>

By the use of a wear energy measuring device, the wear energy of the sipe edge of each test tire was measured. The result is a reciprocal of the wear energy indicated by an index based on the comparative example 2 being 100, wherein the larger the value, the smaller the wear energy and the better the uneven wear resistance.

<Steering Stability on Dry Roads> steering stability when the test vehicle provided with the respective test tires was running on a dry road surface, was evaluated by the driver's feelings. The result is a score based on the comparative example 2 being 100, wherein the larger the value, the better the steering stability.

The test results are shown in Table 2.

TABLE 2

| | comparative example 2 | comparative example 3 | working example 9 | working example 10 | working example 11 | working example 12 | working example 13 | working example 14 | working example 15 | comparative example 4 |
|---|---|---|---|---|---|---|---|---|---|---|
| FIG. showing sipe shape | FIG. 14(A) | FIG. 14(B) | FIG. 12(A) | FIG. 12(A) | FIG. 12(A) | FIG. 12(A) | FIG. 12(A) | FIG. 12(A) | FIG. 12(A) | FIG. 12(A) |
| fourth sipe segment length L4/ second sipe segment length L2 | 1.00 | 1.00 | 1.40 | 1.10 | 1.20 | 1.30 | 1.50 | 1.30 | 1.30 | 1.40 |
| angle θ1 of acute-angled portion | — | 65 | 65 | 65 | 65 | 65 | 65 | 50 | 80 | 65 |
| cross-sectional shape of each sipe segment | linear | linear | zigzag | zigzag | zigzag | zigzag | zigzag | zigzag | zigzag | linear |
| traction on ice (score) | 100 | 101 | 105 | 102 | 103 | 104 | 105 | 103 | 104 | 103 |
| uneven wear resistance performance (index) | 100 | 102 | 104 | 102 | 103 | 104 | 104 | 104 | 103 | 102 |
| steering stability on dry roads (score) | 100 | 100 | 102 | 102 | 102 | 102 | 102 | 105 | 103 | 100 |

From the test results, it was confirmed that the working example tires provided a large traction on ice while exhibiting excellent uneven wear resistance. Further, it was confirmed that, on a dry road surface, the working example tires exhibited steering stability equal to or higher than that of the comparative example 2.

The invention claimed is:

1. A tire comprising a tread portion, wherein
the tread portion is provided with a sipe,
the sipe comprises a portion in which a plurality of repeat units are connected in series in a length direction of the sipe,
each of the repeat units is bent so that four sipe segments form acute angles with each other,
the four sipe segments include:
a first sipe segment extending in a tire axial direction,
a second sipe segment extending from an end in a first tire axial direction of the first sipe segment toward a first tire circumferential direction,
a third sipe segment extending in the first tire axial direction from the second sipe segment, and
a fourth sipe segment connected to the third sipe segment and extending from the third sipe segment toward a second tire circumferential direction opposite to the first tire circumferential direction, and
each of the first sipe segment and the third sipe segment comprises, in a cross section orthogonal to a length direction of the corresponding sipe segment, an oscillated portion which extends in a tire radial direction, while oscillating in a lateral direction orthogonal to the length direction of the corresponding sipe segment, wherein
the oscillated portion of the first segment and the oscillated portion of the third sipe segment extend in the radial direction of the tire, while oscillating in opposite phases.

2. The tire as set forth in claim 1, wherein each of the first sipe segment and the third sipe segment extends at an angle of not more than 35 degrees with respect to the tire axial direction.

3. The tire as set forth in claim 1, wherein each of the repeat units is bent so that the four sipe segments form angles of 30 to 70 degrees with each other.

4. The tire as set forth in claim 1, wherein a linear bottom portion extending parallel to the tire radial direction is connected to an inner side in the tire radial direction of each oscillated portion.

5. The tire as set forth in claim 4, wherein a length in the tire radial direction of the linear bottom portion is 0.10 to 0.30 times a length in the tire radial direction of the sipe segment to which the linear bottom portion belongs.

6. The tire as set forth in claim 1, wherein a bending width of each oscillated portion is 0.4 to 1.0 mm.

7. The tire as set forth in claim 1, wherein each oscillated portion comprises two or more first convex portions which are convex toward one side in the lateral direction.

8. The tire as set forth in claim 7, wherein each oscillated portion is composed of the two first convex portions and one second convex portion which is convex toward the other side in the lateral direction between the two first convex portions.

9. The tire as set forth in claim 8, wherein a widthwise centerline of each oscillated portion comprises a first vertex at which the first convex portion is bent, and a second vertex at which the second convex portion is bent,
   a virtual straight line drawn between both ends of the center line is parallel to the tire radial direction, and
   the second vertex is positioned on the virtual straight line.

10. The tire as set forth in claim 9, wherein the center line of the oscillated portion includes an outer end on the outer side in the radial direction of the tire and an inner end on the inner side in the radial direction of the tire,
    each oscillated portion comprises a first bent element from the outer end to the second vertex and a second bent element from the second vertex to the inner end, and
    the length in the tire radial direction of the first bent element is the same as the length in the tire radial direction of the second bent element.

11. A tire comprising a tread portion, wherein
    the tread portion is provided with a sipe,
    the sipe comprises a portion in which a plurality of repeat units are connected in series in a length direction of the sipe,
    each of the repeat units is bent so that four sipe segments form acute angles with each other
    the four sipe segments include:
       a first sipe segment extending in a tire axial direction,
       a second sipe segment extending from an end in a first tire axial direction of the first sipe segment toward a first tire circumferential direction,
       a third sipe segment extending in the first tire axial direction from the second sipe segment, and
       a fourth sipe segment connected to the third sipe segment and extending from the third sipe segment toward a second tire circumferential direction opposite to the first tire circumferential direction, and
    at least one of the first sipe segment and the third sipe segment comprises, in a cross section orthogonal to a length direction of the corresponding sipe segment, an oscillated portion which extends in a tire radial direction, while oscillating in a lateral direction orthogonal to the length direction of the corresponding sipe segment, wherein
    the first sipe segment extends at an angle of 0+/−5 degrees with respect to the tire axial direction,
    the third sipe segment extends at an angle of 0+/−5 degrees with respect to the tire axial direction, and
    the length of the fourth sipe segment is 1.10 to 1.50 times the length of the second sipe segment..

12. The tire as set forth in claim 11, wherein the fourth sipe segment extends to the second tire circumferential direction side of a region extended from the first sipe segment toward the first tire axial direction.

13. The tire as set forth in claim 11, wherein each of the first sipe segment and the third sipe segment extends at an angle of 0 degree with respect to the tire axial direction.

14. The tire as set forth in claim 11, wherein each of the four sipe segments extends in a zigzag shape in a cross section orthogonal to its length direction.

15. A tire comprising a tread portion, wherein
    the tread portion is provided with a sipe,
    the sipe comprises a portion in which a plurality of repeat units are connected in series in a length direction of the sipe,
    each of the repeat units is bent so that four sipe segments form acute angles with each other,
    the four sipe segments include
       a first sipe segment extending in a tire axial direction,
       a second sipe segment extending from an end in a first tire axial direction of the first sipe segment toward a first tire circumferential direction,
       a third sipe segment extending in the first tire axial direction from the second sipe segment, and
       a fourth sipe segment connected to the third sipe segment and extending from the third sipe segment toward a second tire circumferential direction opposite to the first tire circumferential direction, and
    each of the first sipe segment and the third sipe segment comprises, in a cross section orthogonal to a length direction of the corresponding sipe segment, an oscillated portion which extends in a tire radial direction, while oscillating in a lateral direction orthogonal to the length direction of the corresponding sipe segment, wherein
    the oscillated portion of the first sipe segment and the oscillated portion of the third sipe segment extend in the radial direction of the tire, while oscillating in opposite phases, and
    each of the first sipe segment and the third sipe segment extends at an angle of not more than 35 degrees with respect to the tire axial direction, wherein
    the four sipe segments of each of the repeat units form angles of 30 to 70 degrees with each other.

16. The tire as set forth in claim 15, wherein
    a linear bottom portion extending parallel to the tire radial direction is connected to an inner side in the tire radial direction of each oscillated portion, and
    a length in the tire radial direction of the linear bottom portion is 0.10 to 0.30 times a length in the tire radial direction of the sipe segment to which the linear bottom portion belongs.

17. The tire as set forth in claim 15, wherein a bending width of the oscillated portion is 0.4 to 1.0 mm.

* * * * *